Sept. 22, 1953     R. SARDESON ET AL     2,652,758
AGITATING DEVICE FOR PHOTOGRAPHIC, LIQUID DEVELOPER
Filed Nov. 22, 1949     6 Sheets-Sheet 1
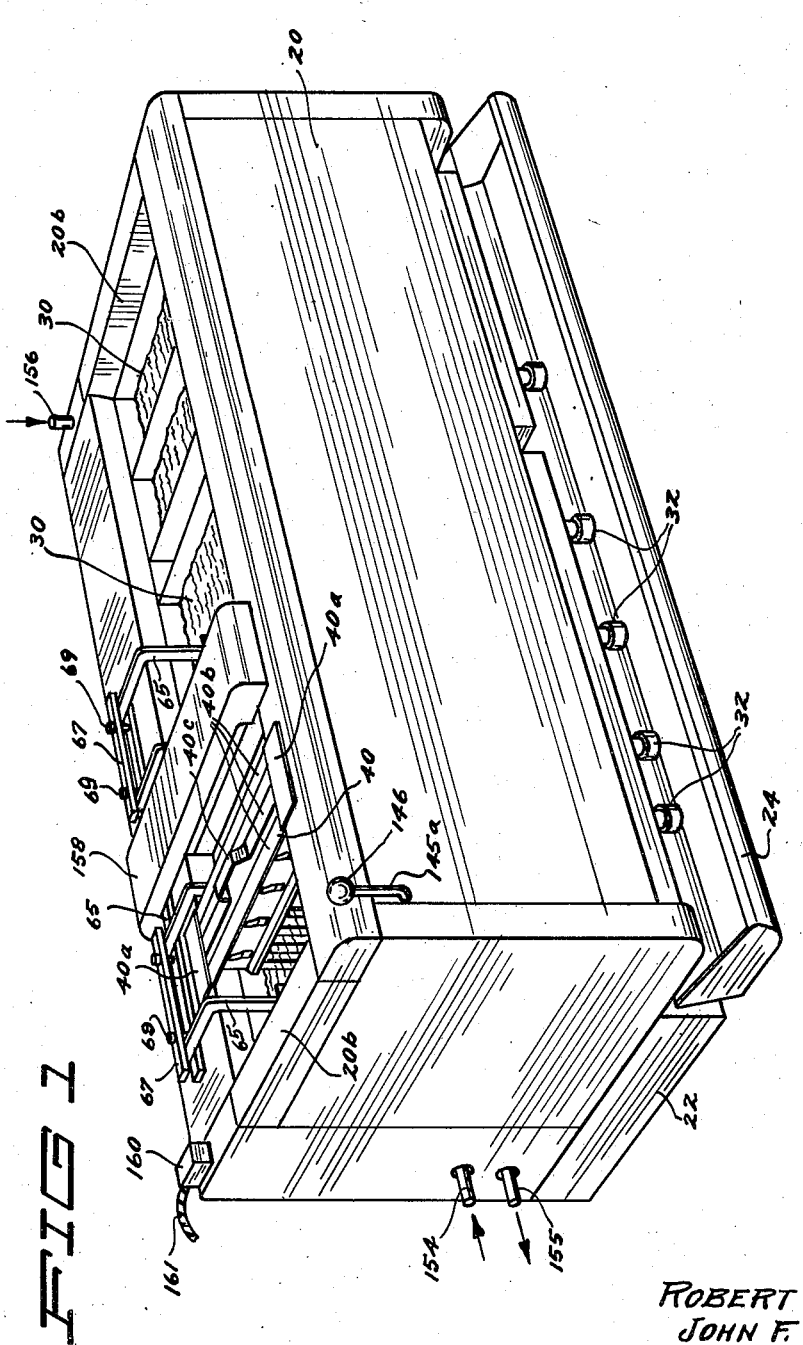
Inventors
ROBERT SARDESON
JOHN F. BRADEN
CONRAD E. LEE
By Chas. C. Reif
ATTORNEY

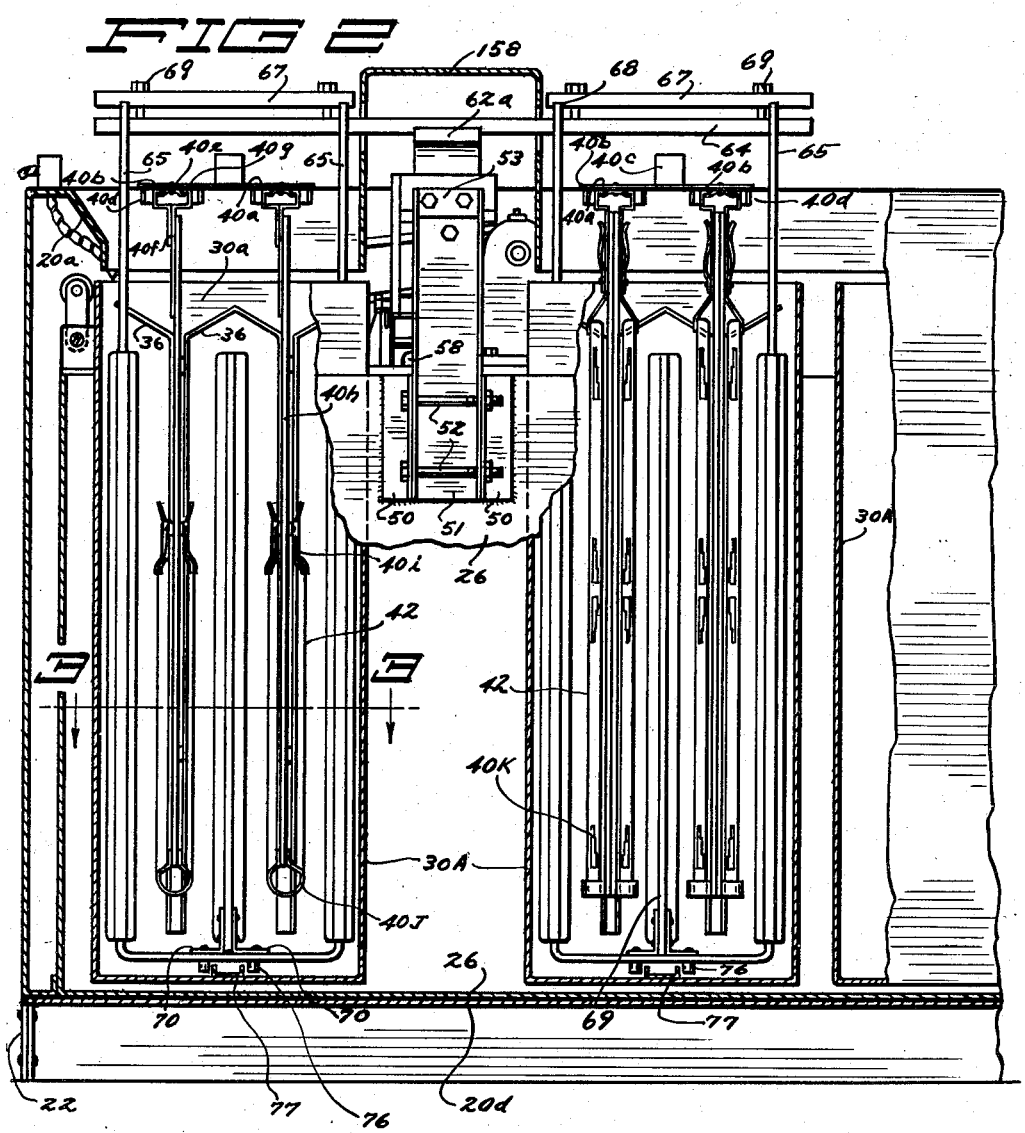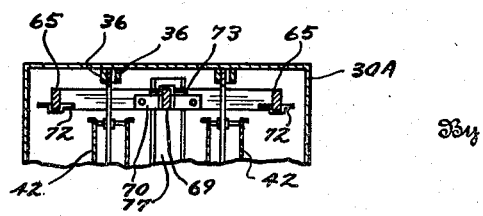

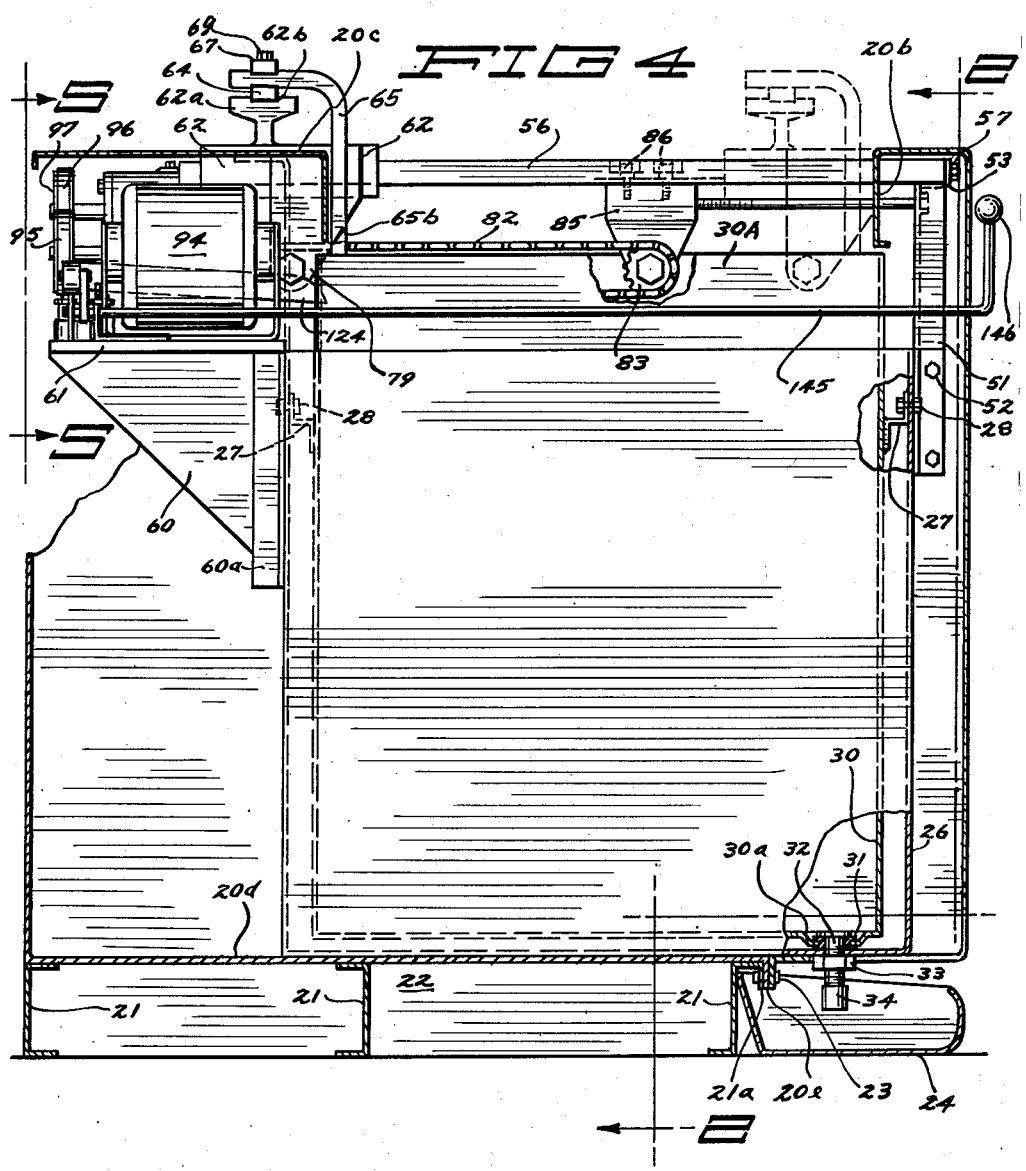

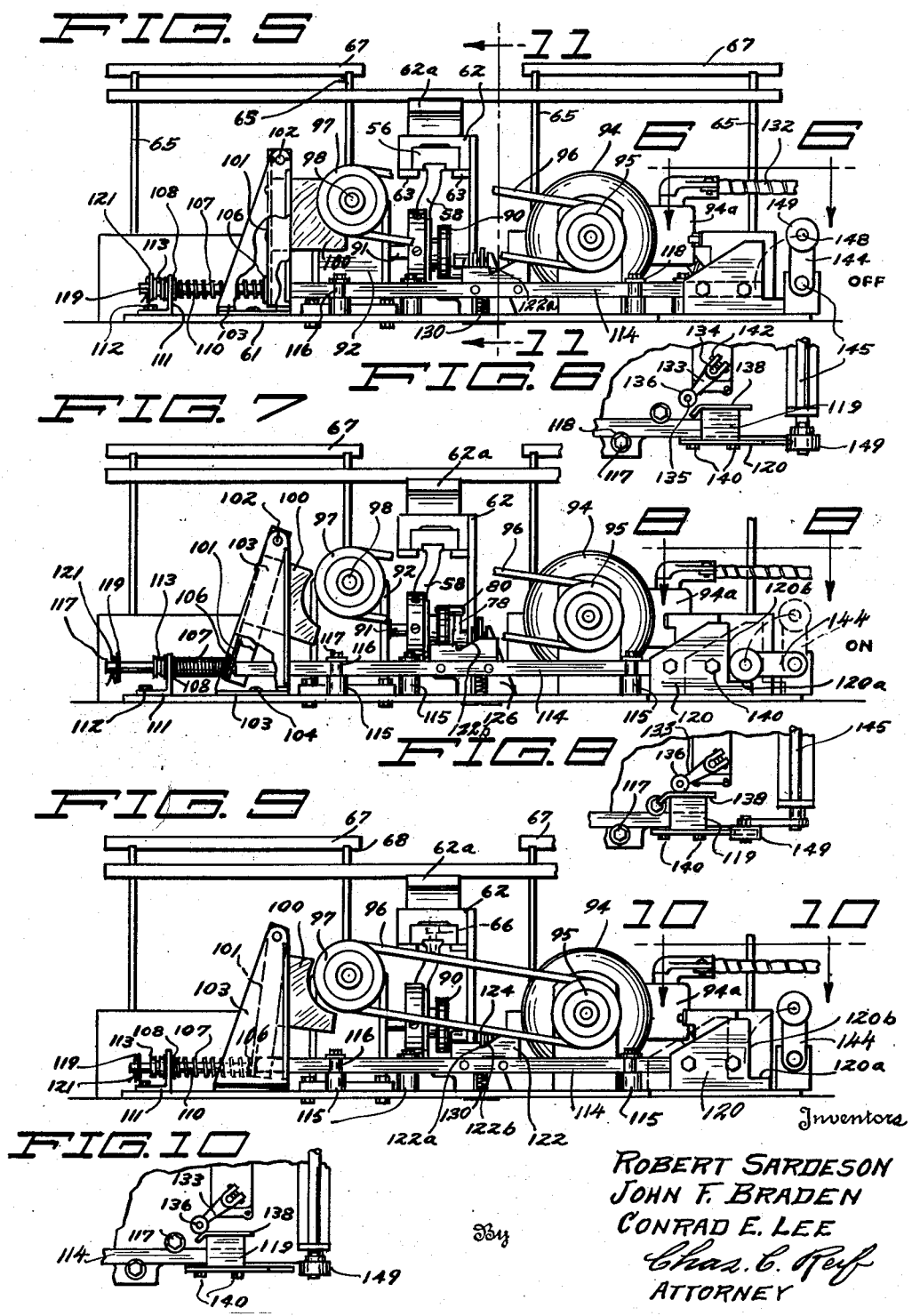

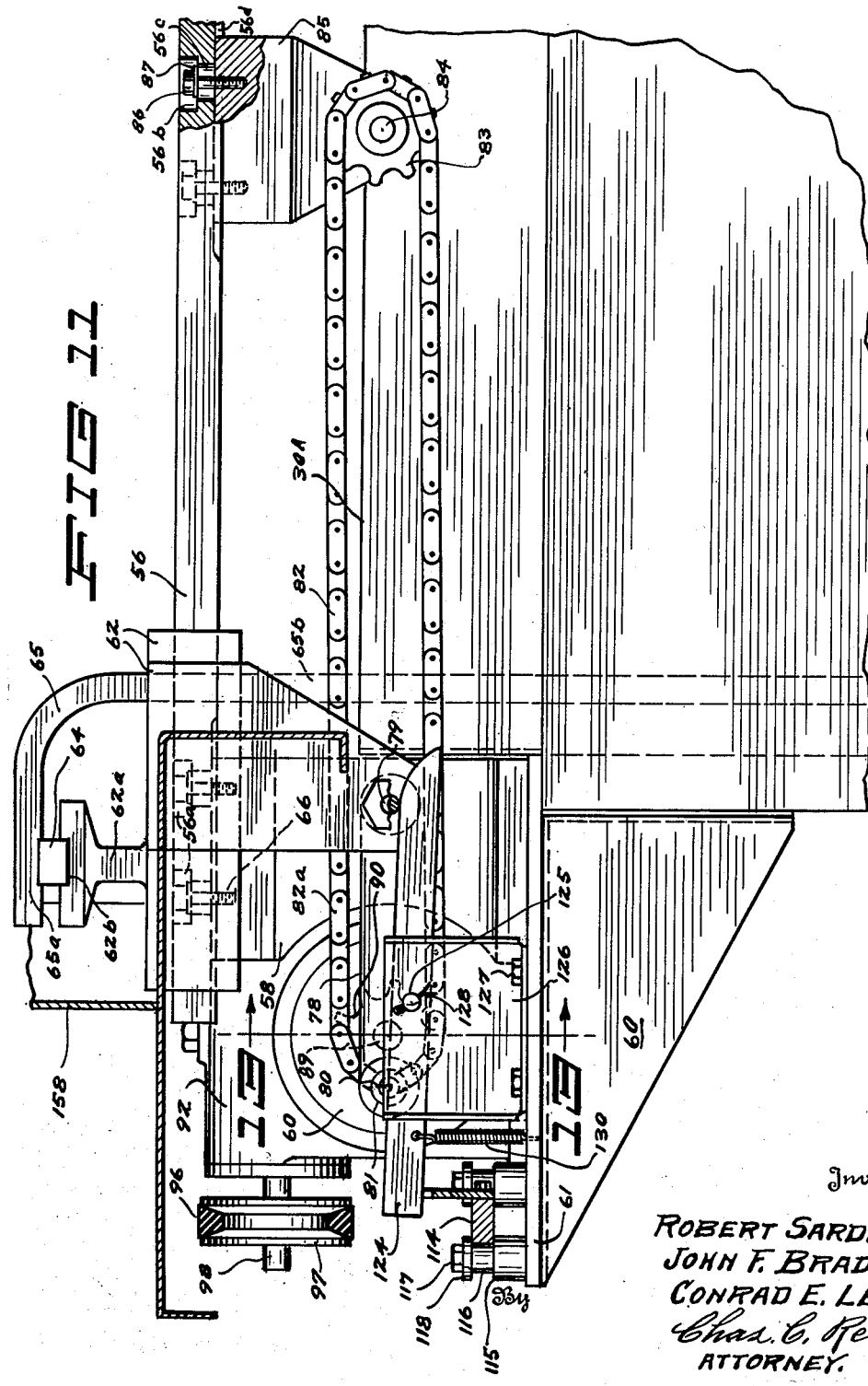

Sept. 22, 1953   R. SARDESON ET AL   2,652,758
AGITATING DEVICE FOR PHOTOGRAPHIC, LIQUID DEVELOPER
Filed Nov. 22, 1949   6 Sheets-Sheet 6
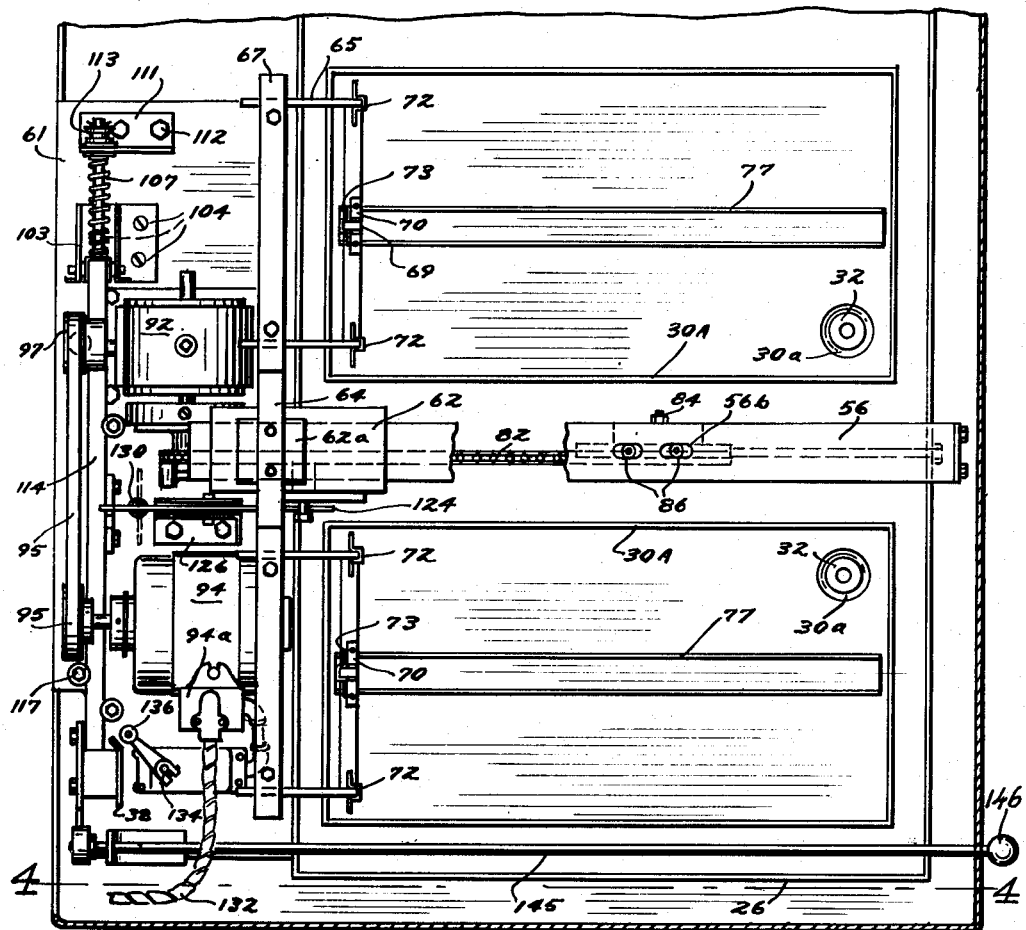
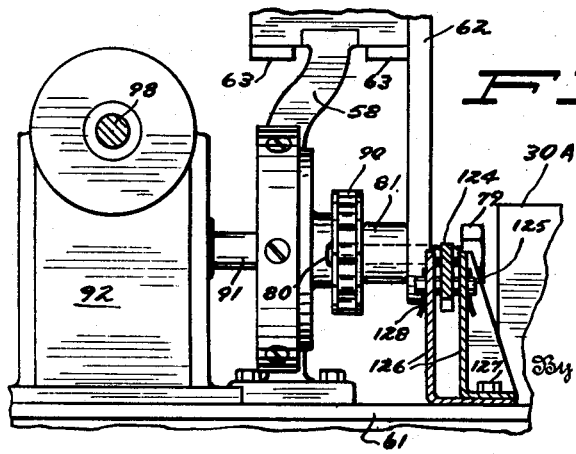
Inventors
ROBERT SARDESON
JOHN F. BRADEN
CONRAD E. LEE
ATTORNEY

Patented Sept. 22, 1953

2,652,758

UNITED STATES PATENT OFFICE 2,652,758

AGITATING DEVICE FOR PHOTOGRAPHIC, LIQUID DEVELOPER

Robert Sardeson, John F. Braden, and Conrad E. Lee, Minneapolis, Minn., assignors to Pako Corporation, Minneapolis, Minn., a corporation of Delaware Application November 22, 1949, Serial No. 128,882

14 Claims. (Cl. 95—89)

This invention relates to a device for agitating the liquid used in the processing of photographic sensitized sheets, such as films or prints. It is desirable and in fact practically necessary with some types of such sheets, such as films used in colored photography, to agitate the treating liquid, such as the developing liquid, to properly process the films.

It is an object of this invention to provide a simple, efficient and power driven device for agitating the liquid in which the films are submersed.

It is also an object of this invention to provide an agitating device having an agitating means, which moves at constant velocity when in the proximity of the sheet or film being processed, thereby effecting uniform development.

It is still another object of this invention to provide a reciprocating agitating means which moves at constant velocity when in the proximity of the sheet or film being processed and which changes its velocity and reverses its direction of motion in a portion of its travel which is removed from the sheet or film.

Another object of this invention is to provide vanes lying respectively in more than one plane to remove air bells from said sheets.

It is another object of the invention to provide an agitating device for the liquid in which photographic sheets are being treated comprising a plurality of agitating members or vanes disposed respectively adjacent said sheets, together with means for moving said members or vanes adjacent said sheets and in planes substantially parallel thereto.

It is a further object of the invention to provide an agitating device for agitating the liquid in which photographic films are being processed comprising a container for holding said liquid and for supporting one or more film hangers on which said films are carried preferably in substantially vertical planes, a plurality of vanes disposed respectively adjacent said films and extending substantially across the same in one direction, and means for reciprocating said vanes in planes substantially parallel to the surface of said films respectively.

It is still another object of the invention to provide such a device as set forth in the preceding paragraph, together with means for stopping the movement of said vanes and positioning them when their movement is stopped at one side of said container whereby they will not interfere with the removal or placement of said hangers or films.

It is also an object of the invention to provide such a device as set forth in the preceding paragraph save one, including means for supporting said vanes so that one or more of the same can move between adjacent films.

It is more specifically an object of the invention to provide an agitating device comprising a receptacle adapted to contain a processing liquid for photographic films and to support hangers carrying films disposed in said liquid and container and preferably in substantially vertical planes, a plurality of agitating vanes disposed in said container respectively adjacent said films and extending substantially across the same in one direction, means supporting said vanes extending without said receptacle, a carrier for said means, a support on which said carrier is slidable, and motor driven means for reciprocating said carrier on said support to move said vanes in planes substantially parallel to the surfaces of said films respectively.

These and other objects and advantages of the invention will be fully set forth in the following description made in connection with the accompanying drawings in which like reference characters refer to similar parts throughout the several views and in which:

Fig. 1 is a diagonal view of the device of this invention;

Fig. 2 is a vertical section taken substantially on line 2—2 of Fig. 4;

Fig. 3 is a horizontal section taken substantially on line 3—3 of Fig. 2;

Fig. 4 is a vertical section taken substantially on line 4—4 of Fig. 12;

Fig. 5 is a view in elevation as seen from the left of Fig. 4 substantially at the line 5—5 of Fig. 4;

Fig. 6 is a partial plan view as seen substantially from the line 6—6 of Fig. 5;

Fig. 7 is a view similar to Fig. 5 showing the parts in different positions;

Fig. 8 is a plan view similar to Fig. 6 showing the parts in different positions;

Fig. 9 is a view similar to Fig. 5 showing the parts in other positions;

Fig. 10 is a view similar to Figs. 6 and 8 also showing the parts in other positions;

Fig. 11 is a partial vertical section taken on line 11—11 of Fig. 5;

Fig. 12 is a partial plan view of the device, some parts being broken away and others shown in horizontal section; and Fig. 13 is a partial section taken on line 13—13 of Fig. 11.

Referring to the drawings, a device is shown comprising a casing 20 of substantially rectangular form in horizontal and vertical cross section. Casing 20 is open at its top and one end thereof extends a short distance inwardly horizontally at its top, then downwardly and inwardly at an inclination, and then vertically for a short distance to form the top portion 20a which extends along one end of said casing. The ends and one side of said casing extend inwardly horizontally at the top of the casing, then downwardly vertically for some distance and then outwardly horizontally for a short distance to form the side and end portions 20b. The other side of said casing is bent outwardly at its top and supports a portion 20c extending inwardly a short distance, then downwardly and then outwardly a short distance. The top part of portion 20c extends horizontally outward quite a distance and has an outer downturned lip. Casing 20 is supported upon a plurality of flanged members 21 extending longitudinally thereof at its bottom and plates 22 extend across the ends of these members. Preferably the plates or sheet material of which the casing is made extends inwardly horizontally to form the bottom 20d of the casing and the ends of said sheet are bent downwardly adjacent one side of the casing to form the portions 20e. One member 21 has a downwardly extending portion 21a adjacent one of the portions 20e and said portion 21a and portions 20e are connected by headed and nutted bolts 23. A drain trough or receptacle 24 is disposed beneath one side of casing 20, as shown in Figs. 1 and 4, said trough having the shape shown in cross section in Fig. 4. Casing 20 has disposed therein and supported on the bottom 20d, a receptacle 26 which is substantially rectangular in vertical and horizontal cross section. Receptacle 26 has secured to the inner sides thereof substantially Z-shaped angle members 27, the same being secured by headed and nutted bolts 28. Disposed within receptacle 26 are a plurality of containers 30 preferably of rectangular form in horizontal and vertical cross section, receptacle 26 and containers 30 having open tops. The sides of containers 30 are spaced from the sides of receptacle 26 and engage members 27 to which they are secured, as by welding. Containers 30 are supported some distance above the bottom of receptacle 26. While this could be variously done, in the embodiment of the invention illustrated containers 30 have a depressed portion 30a in the bottom thereof having an opening centrally therethrough, and a spool-like member 31 of yielding or resilient material is disposed in this opening with flanges extending at the top and bottom sides of said depressed portion. A pipe 32 extends through member 31 and has a collar or flange at its upper end engaging the top of member 31, the top of said flange or collar being flush with the bottom of container 30. Pipe 32 is threaded to receive a nut 33 engaging the bottom of receptacle 26 so that the flange or collar at the top of pipe 32 can be drawn tightly against member 31 and said member drawn tightly against the bottom of receptacle 26 to make a fluid-tight joint. Pipe 32 has a sleeve 34 at its bottom disposed within the trough 24. There are a plurality of the pipes 32 with the described adjacent parts, as shown in Fig. 1, the same being connected to the various containers 30. Containers 30 are adapted to receive and hold the various processing liquids. The ones at the left of Fig. 1 will contain developer, and the others will contain respectively a short stop solution, fixing solution, and washing solutions. The parts of the containers 30 adjacent the long side of casing 20 will be referred to as the ends of the containers. The pair of containers at the left-hand end of Fig. 1, which will be referred to as containers 30A, have secured to their ends spaced plates 36 which project inwardly at right angles to said ends. Said plates are in pairs, as shown in Fig. 2, and the plates of each pair diverge at their upper ends and extend vertically in parallel relation below said upper diverging end portions. The casing 20 is adapted to support one or more film hangers 40. Said film hangers could be of various forms, but in the embodiment of the invention illustrated they are shown as having plates 40a at their tops which project at the sides of said hangers and are supported upon the sides of casing 20, as shown in Fig. 1. Said hangers have spaced top plates 40b extending between plates 40a, the central one of which is bent upwardly to form a handle 40c. Said hangers are shown as having short plates 40d extending downwardly vertically from their top portions, and between plates 40a is a plate 40e secured to the top central plate 40b and having downwardly offset and laterally projecting portions. A removable portion 40f has a top portion rectangular in cross section with inwardly projecting portions 40g adapted to be received between the laterally projecting portions of plates 40e and the top plate 40b. These portions 40f can be removed bodily from the top portion of the hanger including parts 40a to 40c. Portions 40f have downwardly extending transversely spaced portions 40h which are provided with a plurality of spaced film gripping means 40i. The film hanger shown in the container 30A at the left of Fig. 2 is adapted to hold a long strip of film and this passes around a semi-cylindrical portion 40j at the bottom part of the hanger. The hangers shown in the receptacle 30A at the right of Fig. 2 are adapted to hold rectangular films of shorter length and these are held at their tops and bottoms by the film gripping means 40k. The hanger shown in the container 30A at the right of Fig. 2 is substantially like that disclosed and claimed in the application of Robert W. Armstrong et al., for "Multiple Film Hanger," filed September 15, 1945, S. N. 616,595. When the hangers are placed in the casing 20 and in the containers 30A, they are guided into position by the diverging upper portions of plates 36 and they have portions which are received and held between the parallel portions of plates 36. The work has to be done in a dark room and the diverging portions of plate 36 greatly assist the operator in quickly placing the hangers in position. Containers 30A are thus adapted to hold the developing liquid and to support the hangers 40 which carry the films 42 which are submerged in said liquid. As shown in Figs. 2 and 4, the films are disposed in substantially vertical and parallel planes.

A pair of spaced angle members 50 are secured to the outer side of receptacle 26 at the top portion thereof and these will be secured in any suitable manner, as by welding. Members 50 have flanges projecting at right angles to the side of receptacle 26 and a channel member 51 is disposed between members 50 with its flanges engaging the flanges of members 50 and being connected thereto by spaced headed and nutted bolts 52. Member 51 extends upwardly and has an angle member 53 secured therein at its top in any suitable manner, as by welding, member 53 having a vertically extending end portion. A bar 56, illustrated as of rectangular form in cross section, rests on member 53 and member 51 and has its end abutting said vertical portion of member 53. Bar 56 is secured to member 53 by a pair of spaced screws 57. Bar 56 extends across receptacle 26 and containers 30A and is supported at its other end in a bracket 58. Bracket 58, see Figs. 2, 5 and 11, is supported on and secured to a plate 61 which in turn is supported by spaced brackets 60 secured to the outer side of receptacle 26. See Figs. 4 and 11. Brackets 60 comprise angle members 60a secured in any suitable manner to the outer side of receptacle 26, as by welding. Bar 56 is secured to bracket 58 by a pair of spaced screws 66 having their heads disposed in recesses 56a in bar 56 so as to be well below the top of said bar. A member 62 which constitutes a slide has a channel extending therethrough in which bar 56 fits, see Fig. 5, and members 63 in the form of flat bars are secured to the bottom of member 62 and extend inwardly under the bottom of bar 56 so that member 62 is firmly held on bar 56 so as to be slidable thereon. Member 62 has an upstanding portion 62a having a groove 62b extending across the top thereof, and a bar 64 shown as of rectangular form in cross section fits in groove 62b and extends quite a distance at either side of portion 62a. A plurality of vertically extending bars 65 have horizontal portions 65a which extend across the top of bar 64 and fit into grooves in the top of bar 64. Bars 65 curve downwardly and have vertical portions 65b which extend downwardly into receptacles 30A, as shown in Figs. 2 and 11. Bars 65 have grooves receiving bar 64 and are held on bar 64 by the bars 67 which extend respectively across the pairs of bars 65 and are held thereagainst by the spaced screws 69 extending through bars 67 and threaded into bar 64. As shown in Fig. 2, bars 65 extend close to the bottom of containers 30A and are connected at their bottoms so that they are really side portions of one U-shaped member. Another bar 69 is secured centrally to the connecting portion of bars 65 and is held between oppositely disposed angle brackets 70 riveted to said connected member and to bar 69. Bars 65 and 69 have secured thereto agitating plates or vanes 72 and 73 respectively. Vanes 72 and 73, as shown in Fig. 2, extend somewhat beyond the tops and bottoms of the films which are held in hangers 40. Said vanes 72 and 73 have portions formed centrally thereof which fit over the edge of the bars 65 and 69 and will be connected to said bars in any suitable manner, as by spot welding. It will be noted that the vanes 73 are disposed between the films on hangers 40. It will also be noted that the vane 73 is in a different plane than the adjacent vanes 72. Member 62 and thus bar 65 and vanes 72 and 73 are moved back and forth across the containers 30A and for this purpose a link 78 is pivotally connected at one end by the headed and nutted bolt 79 to the lower portion of a plate-like depending part of member 62. Link 78 is pivotally connected at its other end by the pivot bolt 80 to a lug 81 secured to one of the links 82a of an endless chain 82. Chain 82 at one end runs over a sprocket 83 journaled on a stud 84 secured in the lower portion of a bracket 85 secured to the bottom of bar 56 by the headed screws 86. Screws 86 have their heads disposed in recesses 56b of bar 56 so as to be disposed well below the top of said bar. Washers 87 are shown underlying the heads of screws 86. Both the screws 66 and 86 extend through elongated slots 56c in bar 56 so that the relative positions of bar 56 and brackets 58 and 85 can be varied. Bracket 85 fits in a slot 56d in the bottom of bar 56. Cylindrical projections 76 extend downwardly from the portion connecting bars 65 and are disposed at either side of a channel member 77 secured to and extending across the bottom of each container 30A. The other end of chain 82 runs over a sprocket 90 secured to a shaft 89 which projects from one side of a speed reduction unit 92 secured to the top of bracket 60. Shaft 89 is also secured to one element of a safety slip clutch 93 to another element of which the slow speed shaft 91 of said unit is connected. A motor 94 illustrated as of the electrical type is mounted on plate 61 and the driving shaft of said motor has secured thereto a pulley 95 over which runs a belt 96 also running over a pulley 97 secured to a shaft 98 forming the driving shaft of the speed reduction unit 92. With the described construction it will be seen that motor 94 will drive the speed reduction unit and sprocket 90 will be driven by the slow speed shaft 91 of unit 92. This will cause chain 82 to travel over sprockets 90 and 83 and link 78 will be carried with said chain and will reciprocate bracket 62 and the parts carried thereby including the vanes 72 and 73.

Pulleys 95 and 97 have grooves therein of trapezoidal shape in cross section and the belt 96 is of similar shape in cross section and fits in said groove. A brake member 100 is secured to a lever 101 which is pivoted by the pivot 102 to a bracket 103 secured to bracket 60 by the headed screws 104. Lever 101, which is of channel shape, is engaged at one side by a washer 106 which is in turn engaged by one end of a compression coiled spring 107. The other end of spring 107 engages a washer 108 carried on a rod 110 which extends through said spring and the vertical flange of an angle bracket 111. A block 113 of resilient material is disposed adjacent bracket 111. A washer 119 is disposed on rod 110 adjacent the end thereof and held thereon by a cotter pin 121. Bracket 111 is secured to plate 61 by spaced screws 112. A rod 114 is supported upon spaced pairs of members 115 secured to plate 61 and above which are mounted rollers 116 adapted to rotate on the vertically disposed bolts 117 extending therethrough and threaded into supports 115. Washers 118 underlie the heads of bolts 117. Rod or bar 114 is thus supported for longitudinal movement. One end of bar 114, namely the left-hand end, as shown in Figs. 5 to 10, engages the side of lever 101 opposite that engaged by washer 106. The other end of bar 114 has secured thereto a block 119 to which is secured a plate-like member 120 having a shoulder or step 120a adjacent a vertical surface 120b. Bar 114 has secured thereto a latch member 122 having a V-shaped notch therein with a vertical side 122a and an upwardly inclined side 122b. A bar 124 which is comparatively thin and of general rectangular shape in cross section is pivoted on a headed pin 125 carried in a bracket 126 secured to plate 61 by the screws 127. Pin 125 is held in place by a cotter pin 128 extending through one end thereof. Bar 124 at one end is held against the latch member 122 by a tensile coiled spring 130 secured to said bar at one end and at its other end being secured to plate 61. The other end of bar 124 has a curved top surface. The top of bar 124 and said curved surface is engaged by a cylindrical projection on bolt or stud 79 in the reciprocation of link 78. A conduit 132 extends to a control box 94a of motor 94.

An arm 133 is mounted to swing about a shaft 134 which is the actuating shaft of the motor switch. Arm 133 carries a stud 135 on which is journaled a small roller 136. Roller 136 is arranged to engage a plate 138 secured to block 119 to which member 120 is secured by the headed bolts 140. Plate 138 has a portion disposed in a vertical plane and parallel to bar 114 and has a shorter inclined portion extended toward bar 114. Arm 133 is shown as having a bifurcated end and being clamped to shaft 134 by a screw 142. A control member for starting and stopping the machine comprises an arm 144 secured to a rod 145 which extends to one side of casing 20 and is provided with a handle portion 145a having at its end a knob 146. Arm 144 carries a stud 148 on which is journaled a roller 149. Roller 149 is positioned to engage the vertical surface 120b and to swing down to the top of step or shoulder 120a, as shown in Fig. 7. Roller 136 is adapted to be engaged by the two portions of plate 138.

Receptacle 26 is provided with inlet and outlet conduits 154 and 155 respectively, as shown in Fig. 1. An inlet conduit 156 is shown for supplying wash water to some of the receptacles 30. A box or casing 160 is shown in Fig. 1 at the top of and at one corner of casing 20. This is a distributing box for various electrical conductors used. A conduit 161 is connected to box 160 and encloses the electrical conductors entering the same. A housing or guard cover 158 extends over the top portions of bar 64 and encloses the upper portion of member 62. Cover 158 extends across casing 20 resting on the top portions thereof.

In operation the containers 30 will be arranged as shown in receptacle 26 and will contain the various solutions used in processing the film. Preferably a temperature regulating liquid is circulated about the containers 30 in receptacle 26 by suitable apparatus forming no part of the present invention. This liquid can enter and leave through conduits 154 and 155 respectively. The machine will be located in a dark room. The films 42 to be processed will be secured to the hangers 40 in the usual manner and said hangers will then be placed in the containers 30A, as shown in Figs. 1 and 2. The films are thus disposed in substantially vertical planes, and as shown, the hangers each have horizontally spaced portions carrying films. When the films are in position and it is desired to start the machine, the operator will swing handle 146 in a counterclockwise direction and this will move arm 144 in a counter-clockwise direction, as seen in Figs. 5 to 10, so that roller 144 will engage the vertical surface 120b and come into the position shown in Fig. 7. Rod 114 is thus pushed to the left, as shown in Fig. 7, and spring 107 is compressed. Member 101 is swung about its pivot 102 in a counterclockwise direction to the position shown in Fig. 7. The brake 100 is thus moved away from belt 96 and pulley 97. When rod 114 was moved to the left, roller 136 moved on to the longer portion of plate 138, as shown in Fig. 8. The switch is thus closed to start the motor 94. Shaft 98 is thus driven and the speed reduction unit 92 is driven and the low speed shaft 91 thereof rotates sprocket 90. Chain 82 is now moved and travels between and over the sprockets 90 and 83. Link 78 thus moves member 62 and this in turn moves bar 64 and the bars 65.

The vanes 72 and 73 are thus moved and these are reciprocated or moved back and forth across the containers 30A and adjacent the films on the hangers 40. It has been found in practice that it is important and necessary to have the vanes in different planes to give the desired agitation of the liquid. Small air bells or bubbles collect on the bottom portions of the films, particularly the one shown in the container 30A at the left in Fig. 2. The vanes being in different planes give just the right wave or motion to the liquid to remove these bubbles. During the developing period therefore the vanes 72 and 73 continue to move back and forth adjacent the films and in planes substantially parallel to the surfaces of said films. The vanes 72 and 73 also move back and forth across containers 30A at constant velocity or uniform speed when they are alongside or in operative agitating position. This is important and gives a uniform development to all parts of the film. It will be noted that as pivot 89 moves around sprockets 83 and 90, the vanes 72 and 73 are substantially at the ends of their travel and not alongside of the films. The vanes are then beyond the film. Also as the pivot 89 moves around the remote sides of sprockets 83 and 90 said pivot has its motion lengthwise of member 56 decelerated and said pivot comes practically to zero velocity lengthwise of member 56 as it is in horizontal alignment with the axes of sprockets 83 and 90. After passing said position said pivot is accelerated in the direction longitudinally of member 56 and acquires uniform velocity as it travels between sprockets 83 and 90. The vanes 72 are thus decelerated as they pass beyond the films at each side thereof and come practically to a stop before making their reverse movement. By thus moving beyond the films and being thus decelerated and stopped before making their reverse movement production of objectionable surges and wave motions in the solution are prevented. The vanes move across the films with a comparatively slow uniform velocity. The solution is thus gently moved and uniform development and treatment is accomplished. By using the U-shaped member forming the bars 65, the lower portion thereof can move beneath the films and the vanes 73 can be disposed between the films on the spaced portions of the film hanger. The members 76 on the bottom of the portion connecting bars 65 move at either side of channel 77 and any appreciable lateral swaying or movement of bars 65 is thus prevented. It is desirable to have the vanes 72 and 73 and the bars 65 and 69 positioned at one end of the containers 30A when the machine is stopped so that said bars and vanes will not interfere with the removal or placement of the film hangers. When the machine is operating, the bar 124 rests on the upper surface of latch member 122, as shown in Figs. 7 and 11. In each reciprocation of member 62, the portion 79 engages the rounded end of bar 124 and depresses this end, thus swinging said bar about its pivot pin 125. The bar 124 is merely moved up and down at this time. When the machine is to be stopped, the operator will swing the handle 146 and the vertical portion of rod 145 in a clockwise direction to a vertical position, thus moving arm 144 to the vertical position shown in Fig. 5. Spring 107 now moves rod 114 to the right, as shown in Figs. 5 to 11. As the rod so moves, it carries latch bar 122 to the left and spring 130 pulls the end of bar 124 downward along the inclined surface 122b and in line with the vertical surface 122a of the notch in latch 122. Bar 124 thus engages the vertical surface 122a and the motion of bar 114 to the right is stopped. This is the position shown in Figs. 9 and 10. At this time switch arm 133 is in the position shown in Fig. 10 and has not moved quite to off position. Chain 82 therefore continues to travel and when portion 79 again engages the rounded end of bar 124, the other end of said bar will be lifted and will be moved out of alignment with vertical surface 122a so that spring 107 can now move bar 114 farther to the right, as shown in Figs. 5 to 10, and said bar will take the position shown in Fig. 5. At this time plate 138 is entirely out of engagement with roller 136 of the switch arm 133 and the switch is opened thus stopping motor 94. When bar 114 reaches the position shown in Fig. 5, the brake 100 is moved against the belt pulley 97 and the machine is brought rather quickly to rest. At this time member 62 is at the end of its movement, as shown in Fig. 11. With the described construction therefore the machine always comes to rest with bars 65 and the vanes 72 and 73 at one end of the containers 30A.

Temperature regulator fluid will usually be circulated about receptacle 26, as stated, through the pipes or conduits 154 and 155, but this has no connection with the present invention. The various liquids can be drained from the containers 30 when desired through the drain pipes 32 and into the trough 24.

From the above description it will be seen that we have a very efficient and comparatively simple agitating device for a photographic liquid. The machine is quite compact and constructed so as to make a very neat appearance. The device has been amply demonstrated in actual practice, found to be very successful and efficient and is being commercially made.

It will of course be understood that various changes may be made in the form, details, arrangement and proportions of the parts, without departing from the scope of applicants' invention, which generally stated, consists in a device capable of carrying out the objects above set forth, in the parts and combinations of parts disclosed and defined in the appended claims.

What is claimed is:

1. An agitating device having in combination, a container adapted to contain a photographic treating liquid and to contain a pair of film hangers carrying photographic sheets disposed in spaced planes in said container and liquid, a plurality of substantially rigid liquid-agitating members disposed adjacent said sheets and extending substantially across the same in one direction and substantially parallel thereto, said agitating members being disposed in planes perpendicular to the planes of said sheets, a member at one side of said sheets and disposed over said container to which said agitating members are connected in fixed relation thereto, supporting means connected to said last mentioned member and extending over and without said container, and means disposed above and supported on said container for reciprocating said supporting means at uniform velocity to move said agitating members in reverse directions substantially parallel to said sheets, one of said agitating members being disposed between adjacent sheets and others at the remote sides of said sheets respectively.

2. An agitating device having in combination, a container adapted to contain a liquid for treating photographic sheets and to support film hangers carrying photographic sheets disposed in spaced planes in said liquid, a plurality of spaced agitating vanes disposed adjacent said sheets respectively, means supported on said container for moving said vanes back and forth in said container in planes substantially parallel to said sheets, and means for rendering said last mentioned means inoperative and positioning said vanes at one side of said container when their motion is stopped whereby said vanes will be positioned so as not to interfere with the removal of said hangers and sheets from said container.

3. An agitating device having in combination, a container adapted to contain a liquid for treating photographic sheets and to support film hangers carrying photographic sheets disposed in spaced substantially vertical planes in said liquid, a plurality of spaced liquid-agitating members disposed adjacent said sheets respectively, means for moving said members back and forth in said container in planes substantially parallel to said sheets, and means for positioning said members adjacent one side of said container when not being moved whereby said vanes will not interfere with the removal of said hangers and sheets from or the placement of the same in said container.

4. An agitating device having in combination, a container adapted to contain a treating liquid and having spaced portions in each of which a pair of photographic sheets are disposed in spaced substantially vertical planes, a guide member extending across said container between said portions, a carriage reciprocable on said guide member, a bar on said carriage extending over said portions, supporting members extending downwardly from said bar, rigid vanes rigidly supported on said supporting members and disposed respectively between and at the remote sides of said sheets, and means supported on said container for reciprocating said carriage to move said vanes in planes adjacent the planes of said sheets.

5. The structure set forth in claim 4, said supporting members comprising a portion disposed below said sheets, said vane disposed between said pair being supported on said last mentioned member and extending upwardly between said pair of sheets.

6. An agitating device having in combination, a container adapted to contain a treating liquid and to have photographic sheets disposed therein in spaced planes, a plurality of liquid-agitating members disposed respectively adjacent said sheets, a carriage reciprocable across and disposed over said container by which said vanes are carried, an endless chain connected to said carriage for reciprocating said carriage and moving said vanes substantially parallel to the surface of said sheets for agitating said liquid and means for moving said chain and agitating member at substantially uniform velocity.

7. The structure set forth in claim 6, a control means for stopping the movement of said last mentioned means and carriage, and means for applying a brake to said driving means as it is stopped.

8. An agitating device having in combination, a container adapted to contain a treating liquid and to have photographic sheets disposed therein in spaced planes, a plurality of liquid-agitating members disposed respectively adjacent said sheets, means supported on said container for moving said vanes back and forth in said receptacle in planes substantially parallel to said sheets, a control member for said means movable to a starting position to cause operation of said means, said control member being movable to a stop position to stop the operation of said means, a second member movable in one direction by said control member when moved to said latter position, a spring urging said second member in one direction and compressed when said control member is moved to start position, a second means for holding said second member in position with said spring compressed, a third member reciprocated by said first mentioned means, an electric motor for actuating said first mention means, a switch for said motor movable to open position by said second member, and a third means operated by said third member when said control member is moved to said stop position for releasing said second member and opening said switch.

9. An agitating device having in combination, a container adapted to contain a liquid for treating photographic sheets and to have sheets disposed in spaced planes in said liquid, a plurality of agitating vanes disposed adjacent said sheets respectively, a carriage extending across said container and carrying said vanes, means for reciprocating said carriage to move said vanes back and forth in said receptacle in planes adjacent said sheets, a latch bar, a spring urging said latch bar longitudinally in one direction, an electric motor for actuating said means, a switch for said motor adapted to be opened by said latch bar, a latch resiliently held in engagement with said latch bar, a control member for said means movable to a position to cause operation of said means and to a stop position for stopping operation of said means, said control member moving said latch bar in the opposite direction when moved to said stop position, a member reciprocable with said carriage for engaging said latch bar as said carriage approaches the end of a reciprocation for releasing said latch bar whereby said spring moves said latch bar and opens said switch.

10. An agitating device having in combination, a container for a solution for treating photographic sheets, means for suspending a pair of photographic sheets in said container with said sheets disposed in parallel planes, said container being of greater dimension than the transverse dimension of said sheets, rigid plate-like vanes disposed between and at the remote sides of said sheets and in planes substantially perpendicular to the planes of said sheets, a member extending across said sheets above the same to which said vanes are secured, means above said container for reciprocating said member and vanes with uniform velocity across and adjacent said sheets and beyond the same some instance at each side thereof.

11. The structure set forth in claim 10, said last mentioned means comprising an endless traveling flexible member passing around pulleys at its ends whereby the velocity of said member is decelerated as said vanes pass beyond said sheets and said vanes are thus similarly decelerated and come practically to a stop before making their reverse movement.

12. An agitating device having in combination, a container adapted to contain a solution for treating photographic sheets, means for supporting a pair of photographic sheets in said container, said sheets being disposed in parallel planes, said container being of greater transverse dimension than said sheets, rigid plate-like vanes disposed between and at the remote sides of said sheets in planes substantially perpendicular to the planes of said sheets and extending across said sheets and means for reversely moving said vanes across and adjacent said sheets and beyond said sheets at each side thereof in a direction substantially perpendicular to the length of said vanes at uniform velocity and decelerating said vanes as they pass beyond said sheets and bringing the same to substantially zero velocity as they reverse their movement.

13. An agitating device having in combination, a container adapted to contain a treating liquid, means supported on and removable from said container for supporting a pair of photographic sheets in said container in spaced planes, a carrier having a member above said sheets and a member below said sheets, a plurality of liquid agitating members extending between said last mentioned members and disposed adjacent said sheets in planes perpendicular to said sheets, means supported on said container for moving said carrier back and forth to reciprocate said agitating members adjacent said sheets and means secured to the bottom of said container for guiding said member disposed below said sheets.

14. In a photographic bath agitation device including means for supporting a pair of photographic sheets submerged in a treating liquid in spaced planes, the combination of a carrier, means for reciprocating said carrier in reverse directions parallel to the plane of said sheets, rigid vanes rigidly secured to said carrier and disposed between and at the remote sides of said sheets respectively, said vanes having liquid moving surfaces disposed in planes perpendicular to the planes of said sheets, said planes in which said vanes are disposed being offset in a direction parallel to the planes of said sheets.

ROBERT SARDESON.
JOHN F. BRADEN.
CONRAD E. LEE.

References Cited in the file of this patent

UNITED STATES PATENTS

| Number | Name | Date |
| --- | --- | --- |
| 2,259,259 | Mace | Oct. 14, 1941 |
| 2,281,094 | Chambers | Apr. 28, 1942 |
| 2,354,225 | Stiffler | July 25, 1944 |